(12) United States Patent
Jaju et al.

(10) Patent No.: US 12,483,875 B2
(45) Date of Patent: *Nov. 25, 2025

(54) SUPPORT FOR CUPS PFCP SESSION AT UE LEVEL FOR SERVING GATEWAY

(71) Applicant: Parallel Wireless, Inc., Nashua, NH (US)

(72) Inventors: Ganesh Jaju, Pune (IN); Ketan Parikh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 318 days.

This patent is subject to a terminal disclaimer.

(21) Appl. No.: 18/353,006

(22) Filed: Jul. 14, 2023

(65) Prior Publication Data

US 2024/0031794 A1 Jan. 25, 2024

Related U.S. Application Data

(63) Continuation of application No. 17/027,519, filed on Sep. 21, 2020, now Pat. No. 11,711,685.

(60) Provisional application No. 62/903,366, filed on Sep. 20, 2019.

(51) Int. Cl.
*H04W 76/10* (2018.01)
*H04W 8/08* (2009.01)

(52) U.S. Cl.
CPC .......... *H04W 8/087* (2013.01); *H04W 76/10* (2018.02)

(58) Field of Classification Search
CPC ..... H04W 8/087; H04W 76/27; H04W 76/10; H04W 88/16; H04W 76/16
See application file for complete search history.

(56) References Cited

U.S. PATENT DOCUMENTS

| | | | | |
|---|---|---|---|---|
| 2019/0313285 | A1* | 10/2019 | Gottwerth | H04W 28/065 |
| 2021/0037415 | A1* | 2/2021 | Liu | H04W 4/70 |
| 2021/0092641 | A1* | 3/2021 | Yang | H04L 12/1407 |
| 2021/0153080 | A1* | 5/2021 | Zhu | H04W 36/0016 |
| 2021/0385727 | A1* | 12/2021 | Ohlsson | H04W 48/02 |
| 2022/0294855 | A1* | 9/2022 | Landais | H04L 69/167 |
| 2022/0304104 | A1* | 9/2022 | Mihály | H04W 76/22 |

* cited by examiner

*Primary Examiner* — Syed Ali
(74) *Attorney, Agent, or Firm* — Michael Y. Saji

(57) ABSTRACT

A method, system and computer readable medium for providing support for CUPS PFCP Session at UE Level for Serving Gateway are presented. In one embodiment, a method includes providing a Packet Forwarding Control Protocol (PFCP) session at a User Equipment (UE) level for a Serving Gateway (SGW); anchoring, by the SGW, the UE session; handling, by the SGW, buffering of Idle UE and UE Active-to-Idle transitions; using, by the SGW, a same PFCP session for all Packet Data Networks (PDNs); and using, by the SGW, a same Buffering Action Rule (BAR) for all PDNs.

6 Claims, 3 Drawing Sheets

SUPPORT FOR CUPS PFCP SESSION AT UE LEVEL FOR SERVING GATEWAY

CROSS-REFERENCE TO RELATED APPLICATIONS

This application is a continuation of U.S. application Ser. No. 17/027,519, filed Sep. 21, 2020, which claims priority under 35 U.S.C. § 119(e) to U.S. Provisional Pat. App. No. 62/903,366, filed Sep. 20, 2019, titled "Support for CUPS PFCP Session at UE Level for Serving Gateway", each of which is hereby incorporated by reference in its entirety for all purposes. The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Definitions: the following terms are used herein: CUPS—Control Plane and User Plane Separation; PFCP—Packet Forwarding Control Protocol; UE—User Equipment; SGW—Serving Gateway; PDN—Packet Data Network; Ebi EPS Bearer Identity; PDR—Packet Detection Rule; FAR—Forwarding Action Rule, and BAR—Buffering Action Rule.

The following technical specifications define certain aspects defining known architectures relating to control plane and user plane nodes.

29.244—3rd Generation Partnership Project; Technical Specification Group Core Network and Terminals; Interface between the Control Plane and the User Plane Nodes (hereby incorporated by reference in its entirety)

29.214—3rd Generation Partnership Project; Technical Specification Group Services and System Aspects; Architecture enhancements for control and user plane separation of EPC nodes (hereby incorporated by reference in its entirety)

SUMMARY

A system is disclosed to identify a mechanism to allow creation of PFCP session at UE level for Serving Gateway (SGW). SGW anchors the UE session, handles buffering of Idle UE and UE Active ←→ Idle transitions. So, having a UE level PFCP session eases the procedures at SGW-C and SGW-U from CUPS perspective.

In one embodiment, a method is disclosed. The method includes providing a Packet Forwarding Control Protocol (PFCP) session at a User Equipment (UE) level for a Serving Gateway (SGW); anchoring, by the SGW, the UE session; handling, by the SGW, buffering of Idle UE and UE Active-to-Idle transitions; using, by the SGW, a same PFCP session for all Packet Data Networks (PDNs); and using, by the SGW, a same Buffering Action Rule (BAR) for all PDNs.

In another embodiment a system is disclosed. The system includes a Serving Gateway (SGW), having a Packet Forwarding Control Protocol (PFCP) session at a User Equipment (UE) level, wherein the SGW anchors the UE session and handles buffering of Idle UE and UE Active-to-Idle transitions; wherein a same PFCP session is used for all Packet Data networks (PDNs); and wherein a same Buffering Action Rule (BAR) is used for all PDNs. The system performs anchoring, by the SGW, the UE session; handling, by the SGW, buffering of Idle UE and UE Active-to-Idle transitions; using, by the SGW, a same PFCP session for all Packet Data Networks (PDNs); and using, by the SGW, a same Buffering Action Rule (BAR) for all PDNs.

In another embodiment a non-transitory computer medium includes instructions for providing support for CUPS PFCP Session at UE Level for Serving Gateway which, when executed, cause a serving gateway to perform steps comprising: providing a Packet Forwarding Control Protocol (PFCP) session at a User Equipment (UE) level for a Serving Gateway (SGW); anchoring, by the SGW, the UE session; handling, by the SGW, buffering of Idle UE and UE Active-to-Idle transitions; using, by the SGW, a same PFCP session for all Packet Data Networks (PDNs); and using, by the SGW, a same Buffering Action Rule (BAR) for all PDNs.

DETAILED DESCRIPTION

Figure 1:
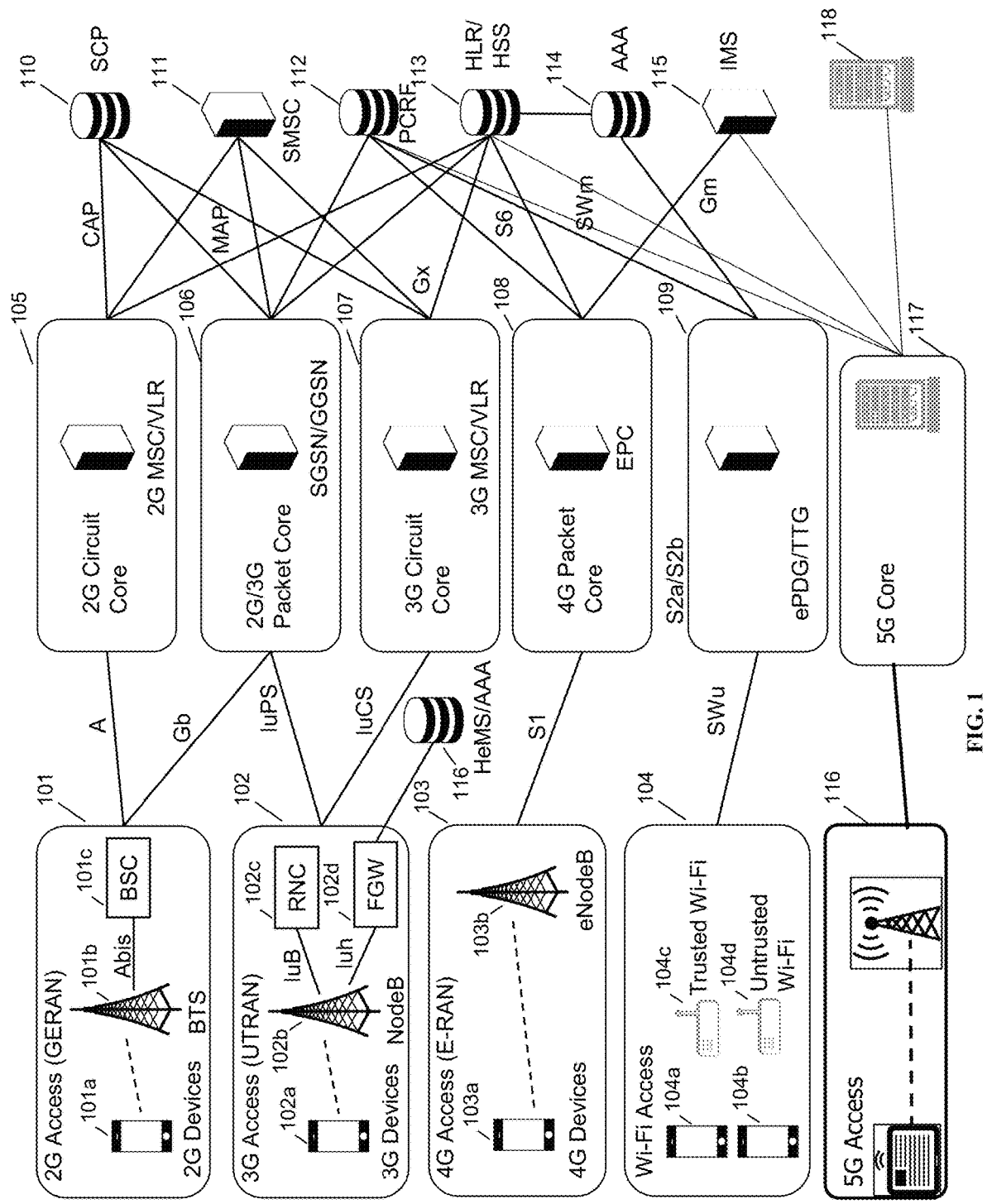
FIG. 1 is a schematic network architecture diagram for 3G and other-G networks.

Traditional system for an SGW UE with three PDNs:

```
SGW UE
    PDN1
        PFCP Session 1
        Bearer1 With Ebi1
            PDR1 (UL), FAR1 (UL)
            PDR2 (DL), FAR2 (DL) and BAR1
        Bearer2 With Ebi2
            PDR3 (UL), FAR3 (UL)
            PDR4 (DL), FAR4 (DL) and BAR1
    PDN2
        PFCP Session 2
        Bearer3 With Ebi3
            PDR5 (UL), FAR5 (UL)
            PDR6 (DL), FAR6 (DL) and BAR2
        Bearer4 With Ebi4
            PDR7 (UL), FAR7 (UL)
```

```
        PDR8 (DL), FAR8 (DL) and BAR2
    PDN3
        PFCP Session 3
            Bearer5 With Ebi5
                PDR9 (UL), FAR9 (UL)
                PDR10 (DL), FAR10 (DL) and BAR3
            Bearer6 With Ebi6
                PDR11 (UL), FAR11 (UL)
                PDR12 (DL), FAR12 (DL) and BAR3
```

As can be seen above, current specifications require a separate PFCP session per SGW PDN and a separate buffer for idle mode for each PDN indicated by a separate BAR Id.

Current specifications indicate a PFCP session at PDN level considering only the needs of PDN Gateway (PGW). Having a separate PFCP session for each PDN at SGW leads to following unnecessary management at SGW:

"Release Access Bearer" Handling

SGW will have to send a PFCP Session Modification Request for each of the PDNs and wait for all the corresponding PFCP Session Modification Responses before it can correlate and send RAB Response.

Buffering of Data for an Idle UE

Spec 29.244 indicates that "In this release of the specification, at most one BAR may be created per PFCP session". What this means is that we need a separate buffer and BAR-Id for each of the PDN. So, the SGW can no longer control the buffering of DL data at the UE level. It can now be defined for PDN level only.

"Downlink Data Notification" Handling

SGW must correlate "Downlink Data Report IE" within "PFCP Session Report Request" from multiple sessions (each corresponding to different PDN) to create a DDN Request towards the MME.

An MME and an SGSN that detects that the UE is in a power saving state (e.g. Power Saving Mode or extended idle mode DRX) and cannot be reached by paging at the moment, shall invoke extended buffering depending on operator configuration. MME/SGSN derives the expected time before radio bearers can be established to the UE. The MME/SGSN then indicates DL Buffering Requested to the Serving GW in the Downlink Data Notification Ack message and includes a DL Buffering Duration time and optionally a DL Buffering Suggested Packet. This "DL Buffering Suggested Packet Count" is supplied at the UE level by the MME. But, because of PFCP session being at the PDN level, it leads to following issues SGW-C will now have to send this information for each PDN using a separate PFCP Session Modification Request.

Since the DL Buffering Suggested Packet count provided at UE level is to be distributed across all PDNs, it can lead to incorrect distribution of packet counts across different PDNs which may not be in sync with UE level count.

"Modify Access Bearers Request" (MABR) Handling

If the Serving GW supports Modify Access Bearers Request procedure and if there is no need for the Serving GW to send the signaling to the PDN GW, the MME may send Modify Access Bearer Request (eNodeB address(es) and TEIDs for downlink user plane for the accepted EPS bearers, Delay Downlink Packet Notification Request) per UE to the Serving GW to optimize the signaling.

In this case having different PFCP session at SGW means, determining the individual PDNs from the MABR Request and then sending "PFCP Session Modification Request" for each of the PDNs to the SGW-U. Also, SGW-C shall wait for all the corresponding PFCP Session Modification Responses before it can correlate and send the "MABR Response" back to MME.

The solution to above problems is having a UE-level PFCP session at SGW. The PDRs will continue to be different for each bearer as earlier but the PDN differentiation can be maintained by the SGW-C and SGW-U need not bother about it. This solves the above-mentioned issues in following manner:

"Release Access Bearer" Handling

With PFCP session at UE level, SGW-C shall send only one PFCP Session Modification Request to mark all the FARs with "Apply Action" as BUFF. And, so it waits only for the sole corresponding PFCP Session Modification Response before it can send the RAB Response.

Buffering of Data for an Idle UE

With PFCP session at UE level, SGW-C shall maintain only one BAR for the entire UE. These eases requirements of controlling Idle mode UE-level DL data buffering.

"Downlink Data Notification" Handling

SGW-U generates "Downlink Data Report IE" within "PFCP Session Report Request" for a PFCP Session. With the session being at UE level, now SGW-U is directly reporting this information at UE level. So, SGW-C needs no correlation and can simply rely on this msg to generate the DDN Request towards the MME.

For an UE in power-saving state, MME/SGSN supplied DL Buffering Duration time and/or DL Buffering Suggested Packet in case of extended buffering can be easily applied at the PFCP session level by just sending a single PFCP Session Modification Request as there is single BAR Id for the entire UE. Also, it does not have to split the buffer size across PDNs and lead to any implementation specific issues/complexity.

"Modify Access Bearers Request" Handling

With PFCP session at UE level, SGW-C shall send only one PFCP Session Modification Request to mark all accepted bearers' FARs with "Apply Action" as FWD with relevant FTEID details. And, so it waits only for the sole corresponding PFCP Session Modification Response before it can send the MABR Response.

Architecture Diagram

Proposed system for an SGW UE with three PDNs:

```
SGW UE
    PFCP Session 1
        Bearer1 With Ebi1
            PDR1 (UL), FAR1 (UL)
            PDR2 (DL), FAR2 (DL) and BAR1
        Bearer2 With Ebi2
            PDR3 (UL), FAR3 (UL)
            PDR4 (DL), FAR4 (DL) and BAR1
        Bearer3 With Ebi3
            PDR5 (UL), FAR5 (UL)
            PDR6 (DL), FAR6 (DL) and BAR1
        Bearer4 With Ebi4
            PDR7 (UL), FAR7 (UL)
            PDR8 (DL), FAR8 (DL) and BAR1
        Bearer5 With Ebi5
            PDR9 (UL), FAR9 (UL)
            PDR10 (DL), FAR10 (DL) and BAR1
        Bearer6 With Ebi6
            PDR11 (UL), FAR11 (UL)
            PDR12 (DL), FAR12 (DL) and BAR1
```

As can be seen above, same "PFCP Session 1" and same BAR "BAR1" is used for all the 3 PDNs of the UE. It is SGW-C's responsibility to keep mapping of PDRs/FARs to SGW PDNs so that it can handle messages like MBR with eNB FTEID change for a PDN.

In some embodiments, the PFCP session is handled at the SGW by instantiating a data structure (representation) that contains information about the UE and about the session. In some embodiments, the SGW may also include a session manager that tracks the PFCP sessions. The session manager can track sessions across multiple RATs, multiple radio access networks or cells, multiple core networks, a single UE across different RATs, RAT interworking, RAT virtualization, RAN virtualization, etc. in some embodiments. The session manager and sessions can be handled using software virtualization, such as containers, and included with other network functions using network function virtualization (NFV) on a NFV-enabled gateway such as the Parallel Wireless HNG. Multiple HNGs could be used as well to scale up from one session to many thousands of sessions. In some embodiments, other mappings besides PDR/FAR to PDN can be maintained at the network node, where the specific mapping is based on the radio access technology. Multiple mappings can be maintained for the same UE but for different radio access technologies.

In some embodiments, transparent signaling could be supported using the present disclosure at the SGW (or at a network node in the core network corresponding to the SGW) in the following scenarios: 5G non-standalone; 4G core for supporting 5G RAN (with or without an HNG/virtualizing gateway); inter-RAT virtualization, e.g., where the UE is actually on one RAT, such as 3G or 5G, and we interwork to 4G at a gateway such as the HNG; RTP localization and general IP traffic localization (cutting out the PGW). Other embodiments would be understood to be enabled by one having skill in the art.

FIG. 1 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 130, the SMSC 131, PCRF 132, HLR/HSS 133, Authentication, Authorization, and Accounting server (AAA) 134, and IP Multimedia Subsystem (IMS) 135. An HeMS/AAA 136 is present in some cases for use by the 3G UTRAN. The diagram is used to indicate schematically the basic functions of each network as known to one of skill in the art, and is not intended to be exhaustive. For example, 5G core 117 is shown using a single interface to 5G access 116, although in some cases 5G access can be supported using dual connectivity or via a non-standalone deployment architecture.

Noteworthy is that the RANs 101, 102, 103, 104 and 136 rely on specialized core networks 105, 106, 107, 108, 109, 137 but share essential management databases 130, 131, 132, 133, 134, 135, 138. More specifically, for the 2G GERAN, a BSC 101c is required for Abis compatibility with BTS 101b, while for the 3G UTRAN, an RNC 102c is required for Iub compatibility and an FGW 102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 2:
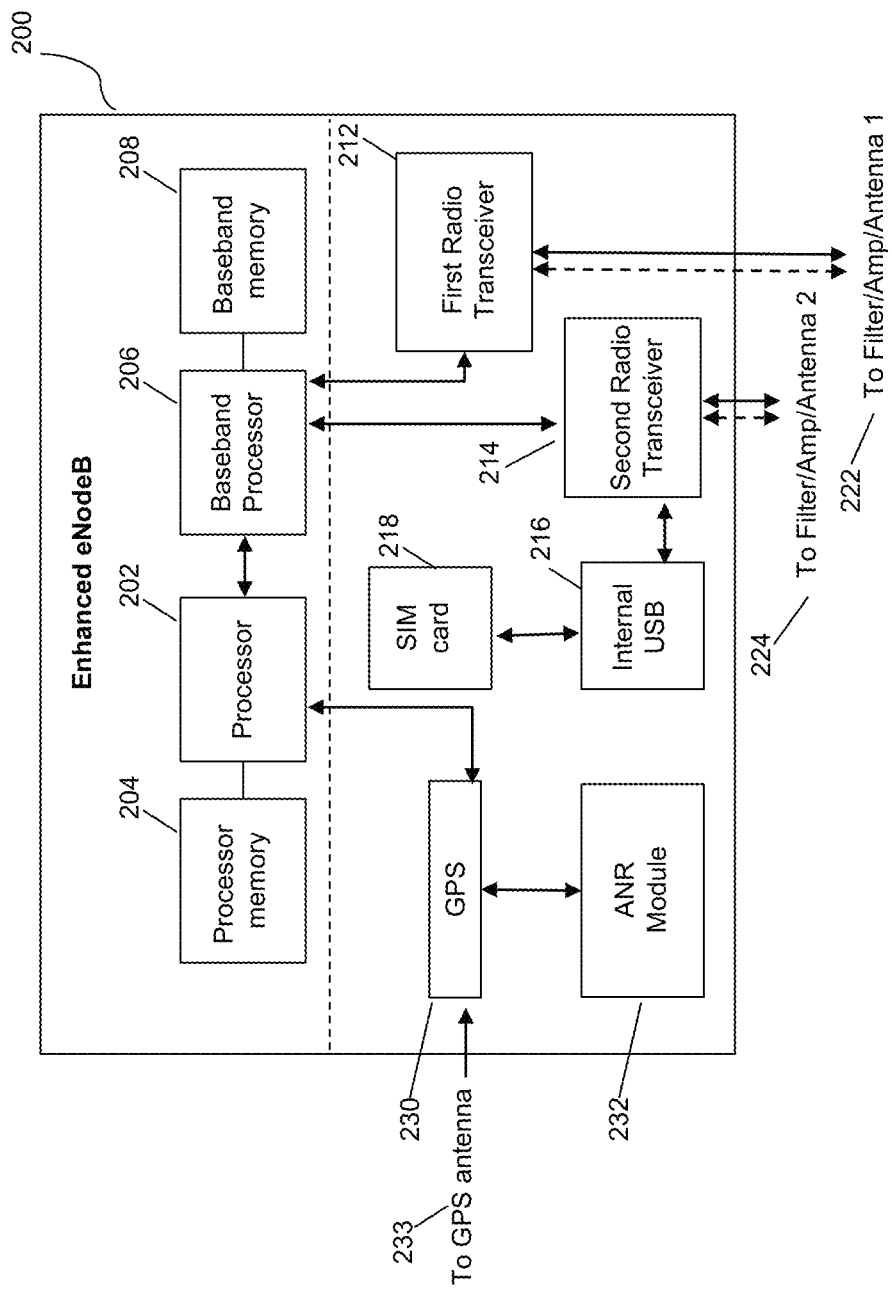
FIG. 2 is an enhanced eNodeB for performing the methods described herein, in accordance with some embodiments.

FIG. 2 is an enhanced eNodeB for performing the methods described herein, in accordance with some embodiments. eNodeB 200 may include processor 202, processor memory 204 in communication with the processor, baseband processor 206, and baseband processor memory 208 in communication with the baseband processor. Mesh network node 200 may also include first radio transceiver 212 and second radio transceiver 214, internal universal serial bus (USB) port 216, and subscriber information module card (SIM card) 218 coupled to USB port 216. In some embodiments, the second radio transceiver 214 itself may be coupled to USB port 216, and communications from the baseband processor may be passed through USB port 216. The second radio transceiver may be used for wirelessly backhauling eNodeB 200.

Processor 202 and baseband processor 206 are in communication with one another. Processor 202 may perform routing functions, and may determine if/when a switch in network configuration is needed. Baseband processor 206 may generate and receive radio signals for both radio transceivers 212 and 214, based on instructions from processor 202. In some embodiments, processors 202 and 206 may be on the same physical logic board. In other embodiments, they may be on separate logic boards.

Processor 202 may identify the appropriate network configuration, and may perform routing of packets from one network interface to another accordingly. Processor 202 may use memory 204, in particular to store a routing table to be used for routing packets. Baseband processor 206 may perform operations to generate the radio frequency signals for transmission or retransmission by both transceivers 210 and 212. Baseband processor 206 may also perform operations to decode signals received by transceivers 212 and 214. Baseband processor 206 may use memory 208 to perform these tasks.

The first radio transceiver 212 may be a radio transceiver capable of providing LTE eNodeB functionality, and may be capable of higher power and multi-channel OFDMA. The second radio transceiver 214 may be a radio transceiver capable of providing LTE UE functionality. Both transceivers 212 and 214 may be capable of receiving and transmitting on one or more LTE bands. In some embodiments, either or both of transceivers 212 and 214 may be capable of providing both LTE eNodeB and LTE UE functionality. Transceiver 212 may be coupled to processor 202 via a Peripheral Component Interconnect-Express (PCI-E) bus, and/or via a daughtercard. As transceiver 214 is for providing LTE UE functionality, in effect emulating a user equipment, it may be connected via the same or different PCI-E bus, or by a USB bus, and may also be coupled to SIM card 218. First transceiver 212 may be coupled to first radio frequency (RF) chain (filter, amplifier, antenna) 222, and second transceiver 214 may be coupled to second RF chain (filter, amplifier, antenna) 224.

SIM card 218 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 200 is not an ordinary UE but instead is a special UE for providing backhaul to device 200.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 212 and 214, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 202 for reconfiguration.

A GPS module 230 may also be included, and may be in communication with a GPS antenna 232 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 232 may also be present and may run on processor 202 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 3:
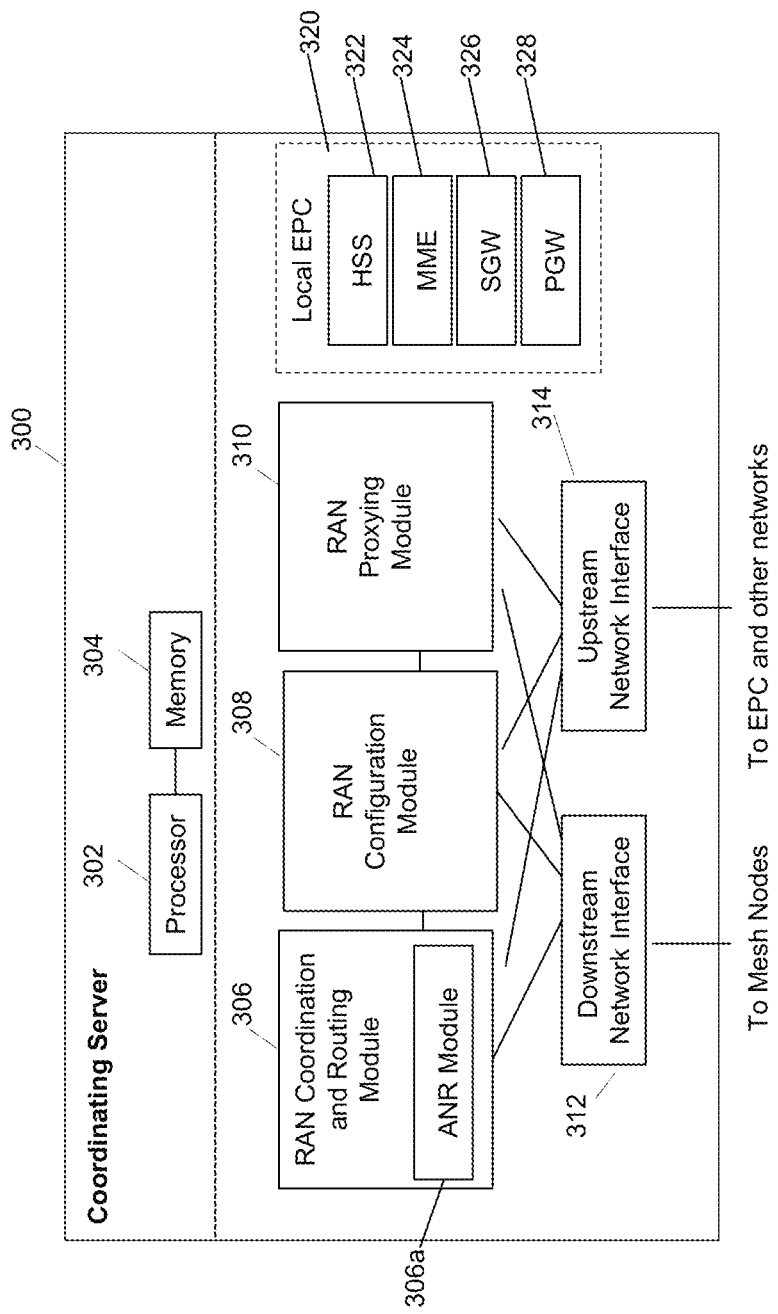
FIG. 3 is a coordinating server for providing services and performing methods as described herein, in accordance with some embodiments.

FIG. 3 is a coordinating server for providing services and performing methods as described herein, in accordance with some embodiments. Coordinating server 600 includes processor 302 and memory 304, which are configured to provide the functions described herein. Also present are radio access network coordination/routing (RAN Coordination and routing) module 306, including ANR module 306a, RAN configuration module 308, and RAN proxying module 310. The ANR module 306a may perform the ANR tracking, PCI disambiguation, ECGI requesting, and GPS coalescing and tracking as described herein, in coordination with RAN coordination module 306 (e.g., for requesting ECGIs, etc.). In some embodiments, coordinating server 300 may coordinate multiple RANs using coordination module 306. In some embodiments, coordination server may also provide proxying, routing virtualization and RAN virtualization, via modules 310 and 308. In some embodiments, a downstream network interface 312 is provided for interfacing with the RANs, which may be a radio interface (e.g., LTE), and an upstream network interface 314 is provided for interfacing with the core network, which may be either a radio interface (e.g., LTE) or a wired interface (e.g., Ethernet).

Coordinator 300 includes local evolved packet core (EPC) module 320, for authenticating users, storing and caching priority profile information, and performing other EPC-dependent functions when no backhaul link is available. Local EPC 320 may include local HSS 322, local MME 324, local SGW 326, and local PGW 328, as well as other modules. Local EPC 320 may incorporate these modules as software modules, processes, or containers. Local EPC 320 may alternatively incorporate these modules as a small number of monolithic software processes. Modules 306, 308, 310 and local EPC 320 may each run on processor 302 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:
1. A method comprising:
providing a Packet Forwarding Control Protocol (PFCP) session at a User Equipment (UE) level, wherein the UE level is different from a Packet Data Network (PDN) level, for a Serving Gateway (SGW);
anchoring, by the SGW, a plurality of UE sessions at a session manager at the SGW, the session manager instantiating a data structure including information about the UE and about UE sessions for the UE with multiple PDNs;
handling, by the SGW, buffering of Idle UE and UE Active-to-Idle transitions for the UE sessions;
handling the session manager and session using software virtualization for network functions using network function virtualization (NFV) on an NFV-enabled gateway;
using, by the SGW, a same PFCP session for the UE sessions across the multiple PDNs; and using, by the SGW, a same Buffering Action Rule (BAR) for all PDNs associated with the UE sessions.

2. The method of claim 1, wherein tracking the PFCP session occurs across at least one of multiple Radio Access Technologies (RATs), multiple Radio Access Networks (RANs) or cells, multiple core networks, a single UE across different RATs, RAT interworking, RAT virtualization, and RAN virtualization.

3. A system comprising:
- a Serving Gateway (SGW), configured to provide a Packet Forwarding Control Protocol (PFCP) session at a User Equipment (UE) level, wherein the UE level is different from a Packet Data Network (PDN) level;
- the SGW further configured to provide anchoring a plurality of UE sessions at a session manager, the session manager configured to instantiate a data structure including information about the UE and about the plurality of UE sessions for the UE with multiple PDNs;
- the SGW further configured to provide handling buffering of Idle UE and UE Active-to-Idle transitions for the UE sessions;
- the SGW further configured to provide handling of the session manager and session using software virtualization for network functions using network function virtualization (NFV) on a NFV-enabled gateway:
- the SGW further configured to provide a same PFCP session for the UE across the multiple PDNs; and
- the SGW further configured to provide a same Buffering Action Rule (BAR) for the UE across the multiple PDNs.

4. The system of claim 3, wherein PFCP session tracking occurs across at least one of multiple Radio Access Technologies (RATs), multiple Radio Access Networks (RANs) or cells, multiple core networks, a single UE across different RATs, RAT interworking, RAT virtualization, and RAN virtualization.

5. A non-transitory computer-readable medium containing instructions for providing support for Control Plane and User Plane Separation (CUPS) Packet Forwarding Control Protocol (PFCP) Session at UE Level for Serving Gateway which, when executed, cause a serving gateway to perform steps comprising:
- providing a Packet Forwarding Control Protocol (PFCP) session at a User Equipment (UE) level, wherein the UE level is different from a Packet Data Network (PDN) level, for a Serving Gateway (SGW):
- anchoring, by the SGW, a plurality of UE sessions at a session manager at the SGW, the session manager instantiating a data structure including information about the UE and about UE sessions for the UE with multiple PDNs;
- handling, by the SGW, buffering of Idle UE and UE Active-to-Idle transitions for the UE sessions;
- handling the session manager and session using software virtualization for network functions using network function virtualization (NFV) on an NFV-enabled gateway;
- using, by the SGW, a same PFCP session for the UE sessions across the multiple PDNs; and
- using, by the SGW, a same Buffering Action Rule (BAR) for all PDNs associated with the UE sessions.

6. The computer-readable medium of claim 5, further comprising instructions wherein tracking the PFCP session occurs across at least one of multiple Radio Access Technologies (RATs), multiple Radio Access Networks (RANs) or cells, multiple core networks, a single UE across different RATs, RAT interworking, RAT virtualization, and RAN virtualization.

* * * * *